US012415543B2

(12) United States Patent
Lee

(10) Patent No.: US 12,415,543 B2
(45) Date of Patent: Sep. 16, 2025

(54) SIMULATION SCENARIO GENERATION BASED ON AUTONOMOUS VEHICLE DRIVING DATA

(71) Applicant: GM Cruise Holdings LLC, San Francisco, CA (US)

(72) Inventor: Ritchie Lee, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 187 days.

(21) Appl. No.: 17/887,232

(22) Filed: Aug. 12, 2022

(65) Prior Publication Data

US 2024/0051574 A1    Feb. 15, 2024

(51) Int. Cl.
*B60W 60/00* (2020.01)
*G05B 17/02* (2006.01)

(52) U.S. Cl.
CPC ......... *B60W 60/0015* (2020.02); *G05B 17/02* (2013.01)

(58) Field of Classification Search
None
See application file for complete search history.

(56) References Cited

U.S. PATENT DOCUMENTS

| | | | |
|---|---|---|---|
| 11,550,851 B1* | 1/2023 | Kabzan | G06N 20/00 |
| 2018/0267538 A1* | 9/2018 | Shum | B60W 30/09 |
| 2019/0101914 A1* | 4/2019 | Coleman, II | G08G 1/0112 |
| 2019/0318267 A1* | 10/2019 | Zhang | G06N 20/00 |
| 2020/0353943 A1* | 11/2020 | Siddiqui | G06N 3/045 |
| 2021/0270630 A1* | 9/2021 | Aota | G01C 21/3697 |
| 2021/0347372 A1* | 11/2021 | Bagschik | G06V 20/56 |
| 2022/0081004 A1* | 3/2022 | Brown | G08G 1/166 |

* cited by examiner

*Primary Examiner* — Khoi H Tran
*Assistant Examiner* — Tristan J Greiner
(74) *Attorney, Agent, or Firm* — Honigman LLP; Matthew H. Szalach; Jonathan P. O'Brien

(57) ABSTRACT

The disclosed technology provides solutions for improving simulation scenario generation and in particular, provides methods for improving the generation of simulation scenarios based on autonomous vehicle (AV) driving data. A method of the disclosed technology can include steps for receiving driving data, which includes sensor data from an AV that is descriptive of an environment around the AV, identifying a vehicle in the environment based on the driving data, generating a synthetic driving scenario emulating the environment based on the driving data, and identifying a trajectory of the vehicle in the synthetic driving scenario. The method can further include steps for replacing the vehicle with the AV in the synthetic driving scenario by simulating navigation of the AV in the synthetic driving scenario along the identified trajectory. Systems and machine-readable media are also provided.

20 Claims, 5 Drawing Sheets

SIMULATION SCENARIO GENERATION BASED ON AUTONOMOUS VEHICLE DRIVING DATA

BACKGROUND

1. Technical Field

The present disclosure generally relates to solutions for generating a simulation scenario for an autonomous vehicle and, more specifically, generating a simulation driving scenario based on autonomous vehicle on-road driving data.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
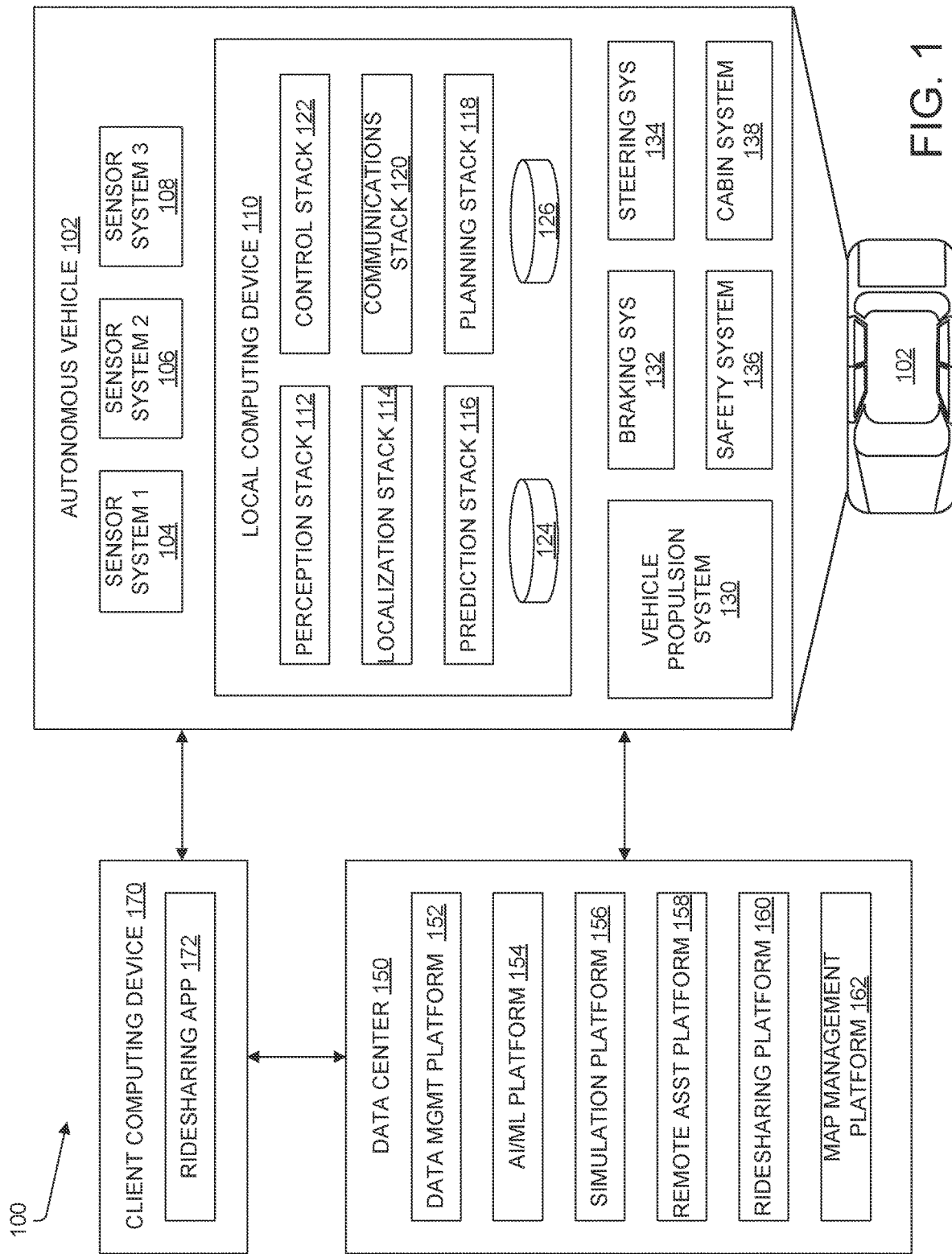
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

A simulation has been a primary way to test the safety of AVs, especially for corner-case scenarios or safety critical events (SCEs) that are hard or unsafe to test in the real world. In addition to realistic visual effects in the simulation, realistic simulation of various real-world driving scenarios is critical. Further, it is essential to have comprehensive testing that covers every possible scenario in the real world so that an AV can be validated by a simulation that is more likely to succeed when applied to the real world.

A simulation system can generate test scenarios (i.e., simulation driving scenarios) based on on-road driving data to resemble the real-world driving environment. As an AV navigates on the road, various sensor systems of the AV collect on-road driving data that is descriptive of the environment around the AV. By replaying log files that record the driving data, a simulator can create a realistic driving scenario for AV testing in simulation. However, the existing method of replay tests can only test the driving scenarios that have been encountered by an AV in the real world. A simulator might not have enough number of certain on-road events due to low occurrences in the real world. As follows, an AV may not sufficiently validate the testing for certain events.

Alternatively, a test scenario can be prepared by manually crafting tests from scratch. For example, for rare events that have low occurrences in the real-world (i.e., long-tail events), a simulator can use a manual script to cover the rare events in the test scenarios. However, such a manual process is not only far from realistic but also can be time-consuming, costly, and laborious.

Therefore, there exists a need for a method to expand the use of AV driving data to generate simulation driving scenarios for AV testing. More specifically, there exists a need for identifying other vehicles in AV driving data and constructing a simulation driving scenario from the perspective of the other vehicles to test the AV in the simulation driving scenario.

Aspects of the disclosed technology provide solutions for improving the generation of simulation driving scenarios and in particular, for improving the generation of simulation driving scenarios for AVs based on driving data. In some implementations, a simulation driving scenario can be constructed by identifying a vehicle in driving data recorded by an AV and swapping the perspective of the AV with the vehicle in the simulation driving scenario. In some aspects, in the simulation driving scenario, the AV can be tested along the trajectory of the vehicle in the recorded driving data. As follows, the present technology expands the range of a source for the test scenarios by a perspective change with other vehicles witnessed by the AV in the driving data. More specifically, a simulator can generate a test scenario that emulates the driving environment witnessed by the AV and have the AV assume the position and trajectory of the other vehicle.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
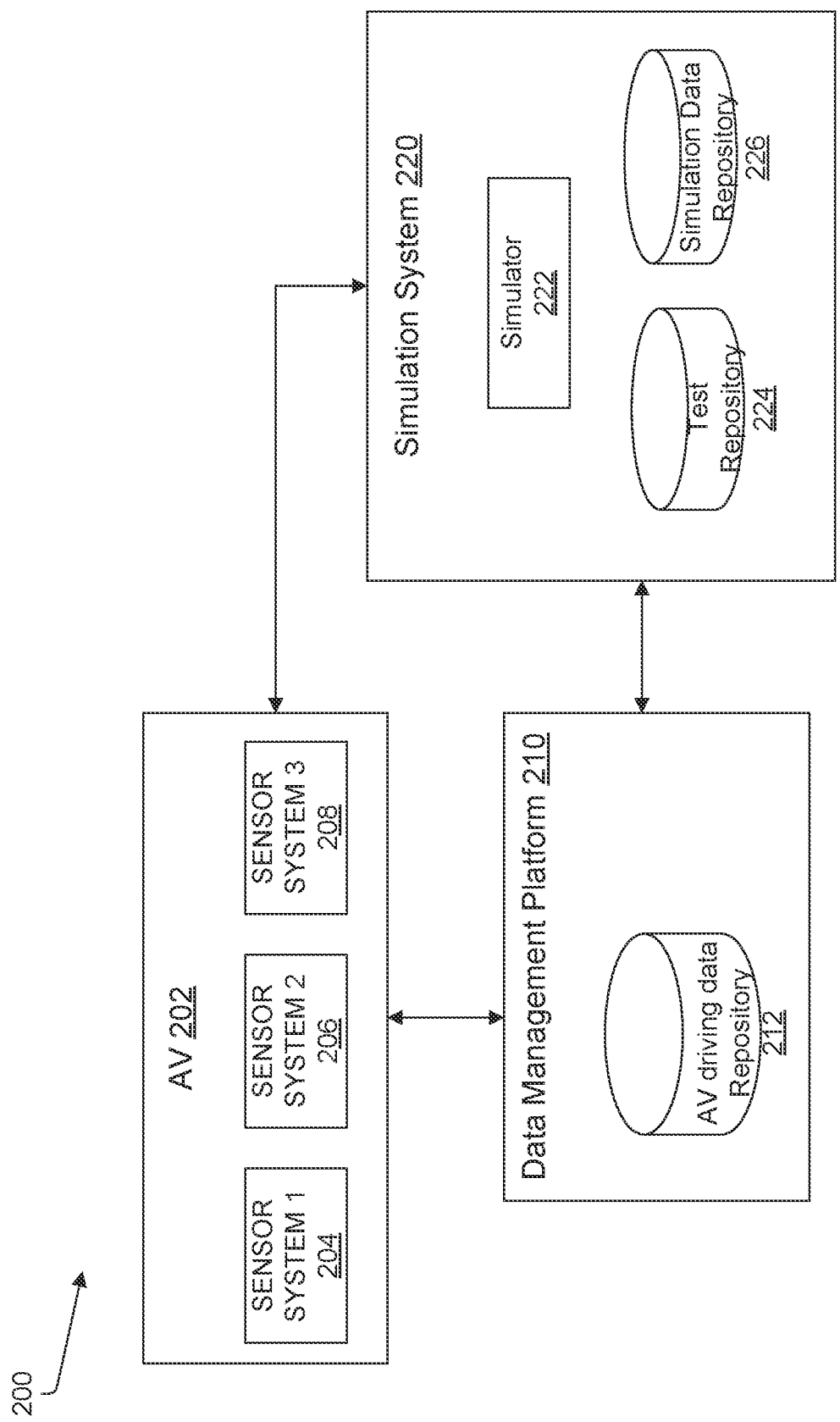
FIG. 2 illustrates an example of a simulation system environment that can be used to generate a simulation scenario based on AV driving data, according to some examples of the present disclosure.

FIG. 2 illustrates a simulation system environment 200 that can be used to generate a simulation driving scenario based on AV driving data. In this example, simulation system environment 200 includes an AV 202, data management platform 210, and simulation system 220, all of which can be in communication with each other to facilitate the generation of a simulation driving scenario based on driving data of AV 202.

In some aspects, AV 202 (similar to AV 102 as illustrated in FIG. 1) includes multiple sensor systems 204, 206, and 208 (similar to sensor systems 104-106 as illustrated in FIG. 1) such as a camera system, a LIDAR system, a RADAR system, or any applicable sensor system that is arranged about AV 202 to observe the environment around AV 202 and capture sensor data in real-time. Further, as shown in FIG. 2, the captured sensor data can be stored in AV driving data repository 212 of data management platform 210, which can be accessed by simulation system 220. The ability of sensor systems 204-208 to accurately detect and characterize objects and elements of the environment is fundamental to providing the sensor data to simulation system 220 for generating a realistic driving scenario that recreates the surrounding environment of AV 202.

Further, the sensor data can include geospatial information and road infrastructure (e.g., streets, lanes, crosswalks, etc.), road segments, buildings, or other items or objects, or other dynamic elements (e.g., other vehicles, bicycles, pedestrians, etc.), direction of traffic lanes (e.g., the location and direction of a parking lane, a turning lane, a bicycle lane, or other lanes within a particular roadway or other travel way), and/or traffic control data (e.g., the location and instructions of signage, traffic lights, or other traffic control devices). The sensor data from a camera system, a LIDAR system, and/or RADAR system can provide useful information about the current location, position, orientation, speed (i.e., velocity), acceleration, deceleration, size, etc. of the object within the surrounding environment of AV 202. For example, AV 202 can witness a collision between a vehicle and a pedestrian. The sensor data captured by AV 202, for example, before, during, and/or after the collision (i.e., at every time stamp), can include information that describes the location, speed, trajectory of each of the vehicle and the pedestrian as well as the relative geometry of the vehicle and the pedestrian. Accurate and detailed information about the scene at every time stamp can enable simulation system 220 to replicate the driving environment in a simulation scenario as close to the real-world setting as possible.

In some aspects, data management platform 210 (similar to data management platform 152 as illustrated in FIG. 1) can include AV driving data repository 212. AV driving data repository 212 is configured to store driving data that is collected by AV 202 while AV 202 navigates roadways (e.g., sensor data captured by various sensor systems 204-208), which can be accessed by simulation system 220.

In some aspects, simulation system 220 (similar to simulation platform 156 as illustrated in FIG. 1) includes simulator 222, test repository 224, and simulation data repository 226. Simulator 222 can prepare simulation test scenarios based on AV on-road driving data (i.e., legacy data), synthetic data (e.g., data collected via simulation), manual scripts, or any applicable information that is available to simulator 222 in generating a driving scenario for AV testing. Various scenarios for testing can be stored in test repository 224. AV 202 can be tested with any of the tests stored in test repository 224. Further, driving data collected by AV 202 while simulating navigation in the driving scenario as provided in the test can be stored in simulation data repository 226.

According to some aspects, simulator 222 is configured to use AV driving data that is descriptive of the driving environments and convert them into simulation frameworks. More specifically, simulator 222 is configured to replicate a wide variety of driving environments and situations encountered by AV 202 and reproduce real-world scenarios based on the AV driving data (e.g., driving data stored in AV driving data repository 226).

According to some aspects, simulator 222 is configured to identify a vehicle in the driving environment captured in the AV driving data. Further, the AV driving data can provide information that describes the location, position, speed, position, and/or orientation of the vehicle. As follows, simulator 222 can determine the trajectory of the vehicle in the driving environment. Simulator 222 can generate a simulation driving scenario emulating the driving environment, which includes the vehicle that is on the identified trajectory.

In the simulation scenario, instead of having AV 202 navigate along the trajectory of AV 202 as described in the driving environment, simulator 222 can replace the vehicle with AV 202. More specifically, simulator 222 can place AV 202 in the position and role of the vehicle to navigate along the original trajectory of the vehicle as identified in the driving environment based on the AV driving data.

In some examples, simulator 222 can modify the simulation driving scenario based on a configuration and/or specification of AV 202 (e.g., width, length, height, etc.). For example, if the vehicle is smaller than AV 202, when AV 202 assumes the position and role of the vehicle in the simulation driving scenario, simulator 222 can adjust the relative distance between AV 202 and other vehicles or objects on the scene.

According to some aspects, simulation system 220 can employ various ways to determine which driving environments provided in the AV driving data or which of objects identified in the driving environments to use for generating a simulation driving scenario and performing a vehicle-to-AV perspective change. To fill in the gaps or improve the coverage area (i.e., types of events) that has an insufficient number of test scenarios, simulation system 220 can specifically mine for a driving environment that includes an event of interest to replicate in a simulation driving scenario.

In some examples, simulator 222 can determine the rarity of events observed by AV 202 in the driving environment. Simulation system 220 may not have a sufficient number of simulation scenarios to test such rare events/long-tail events and validate the safety (i.e., not significant enough to capture the full risk of the events) due to scarcity in the driving data. While AV 202 may not have the first-hand experience of the rare events, it might have witnessed other vehicles or entities involved in the rare events. As follows, simulation system 220 can utilize the AV driving data that includes the rare events that happened to other vehicles to create a simulation scenario and perform a vehicle-to-AV perspective change.

Non-limiting examples of rare events can include other entities (e.g., vehicles, motorcycles, bikes, etc.) driving in an opposite direction, encountering an oncoming emergency vehicle (EMV), the presence of a pedestrian in an occluded view while backing out of a driveway, a difficult lane change, jaywalkers, an evasive maneuver (e.g., hard brake, swerve), lane splitters (e.g., closely following motorcycles or bikes), pedestrians crossing roads in absence of traffic lights, drifting to the wrong side of the road (e.g., due to wheel slip or high speed), pedestrians lying on the ground (e.g., for fixing their vehicles), bike riders falling off into an AV's lane or in front of the AV, running red lights, abnormal-shaped vehicles (e.g., articulated vehicles, bizarre-looking trucks or trailers, etc.), cutting-off vehicles, a high-speed blow-through, other vehicles backing into an AV, interactions with a garbage truck, school bus, or train, and/or non-working traffic light.

In some aspects, simulation system 220 can query test repository 204 to determine a number of test scenarios that include the rare event of interest. Simulation system 220 can compare the number of test scenarios to a threshold (i.e., predetermined number). If the number of test scenarios is lower than the threshold, simulator 222 can reproduce a driving environment that involves the rare event and convert it to a simulation scenario where AV can be placed in the role of another entity for testing.

Similarly, in some examples, simulation system 220 can query data management platform 210 (or AV driving data repository) to determine a number of certain rare events observed by AV 202 in the AV driving data. Simulation system 220 can then compare the number of the rare events to a threshold. If the number of rare events identified in the AV driving data is lower than the threshold, simulator 222 can reproduce the driving environment that includes the rare event and convert it to a simulation scenario where AV can be placed in the role of another entity for testing.

In some examples, the query process (e.g., querying test repository 204 for test scenarios or querying data management platform 210 for AV driving data) can be done programmatically. For example, Structured Query Language (SQL) commands can be used to search the database (e.g., test repository 204 or data management platform 210) and return results with certain rare events. Certain classes of events (e.g., evasive maneuver, rapid deceleration) can be used as triggers for the SQL commands.

In some examples, simulation system 220 can enable the perspective change/switch with an entity that AV 202 has directly interacted with. For example, when AV 202 cut into another vehicle with an evasive maneuver, simulator 222 can reproduce the driving environment and replace the vehicle with AV 202.

A high number of rare events or driving scenarios emerge from a safety critical event. By way of example, the safety critical event may be a collision event (e.g., a collision with other vehicles, a pedestrian, an animal, a static object on the scene, etc.). In some examples, a safety critical event can include a near miss (i.e., near collision or near crash) or any crash-relevant event. Further, a safety critical event can include pre-collision events or hazard events that may lead to a failure of operation of AV 202. Non-limiting examples of a safety critical event include a sudden failure of vehicle operation (e.g., shutdown or breakdown of an engine) on the road, a flat tire or tire blowout on the road, etc.

According to some aspects, simulation system 220 can determine that AV driving data includes a driving environment where a vehicle is involved in a safety critical event. As follows, simulator 222 can generate a simulation driving scenario that is replicate of the driving environment and have AV 202 navigate in the simulation driving scenario along the trajectory of the vehicle as witnessed by AV 202 in the driving environment.

Figure 3B:
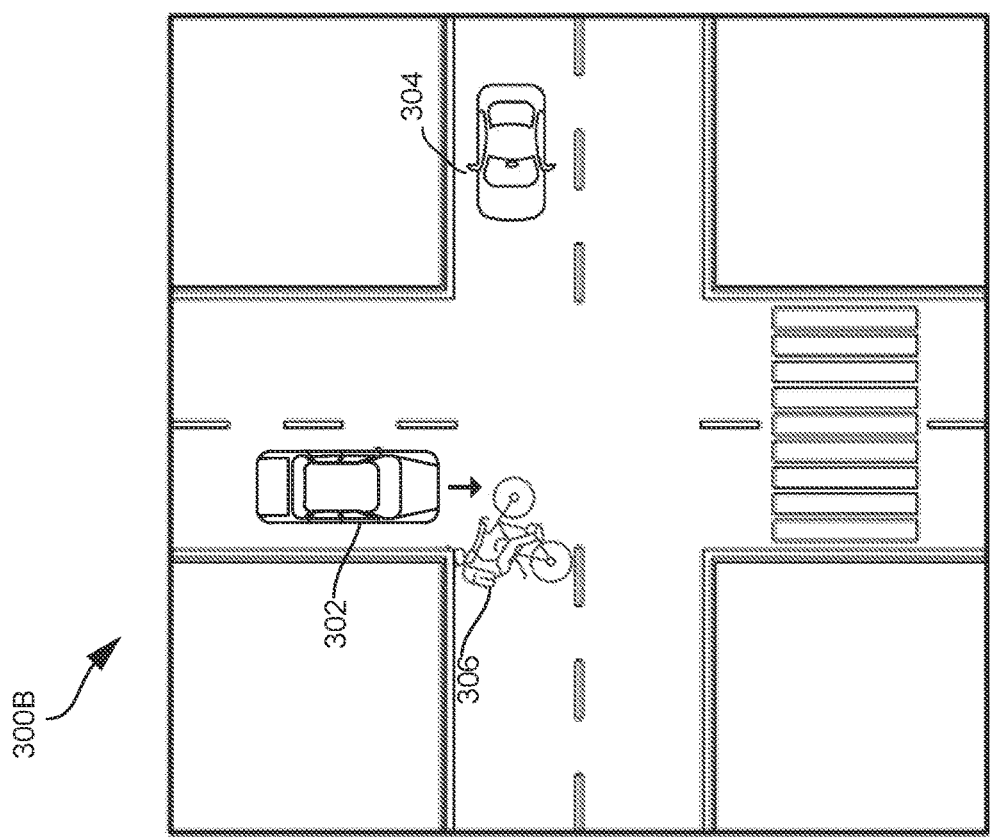
FIG. 3B illustrates an example of a simulation driving scenario, according to some examples of the present disclosure.
Figure 3A:
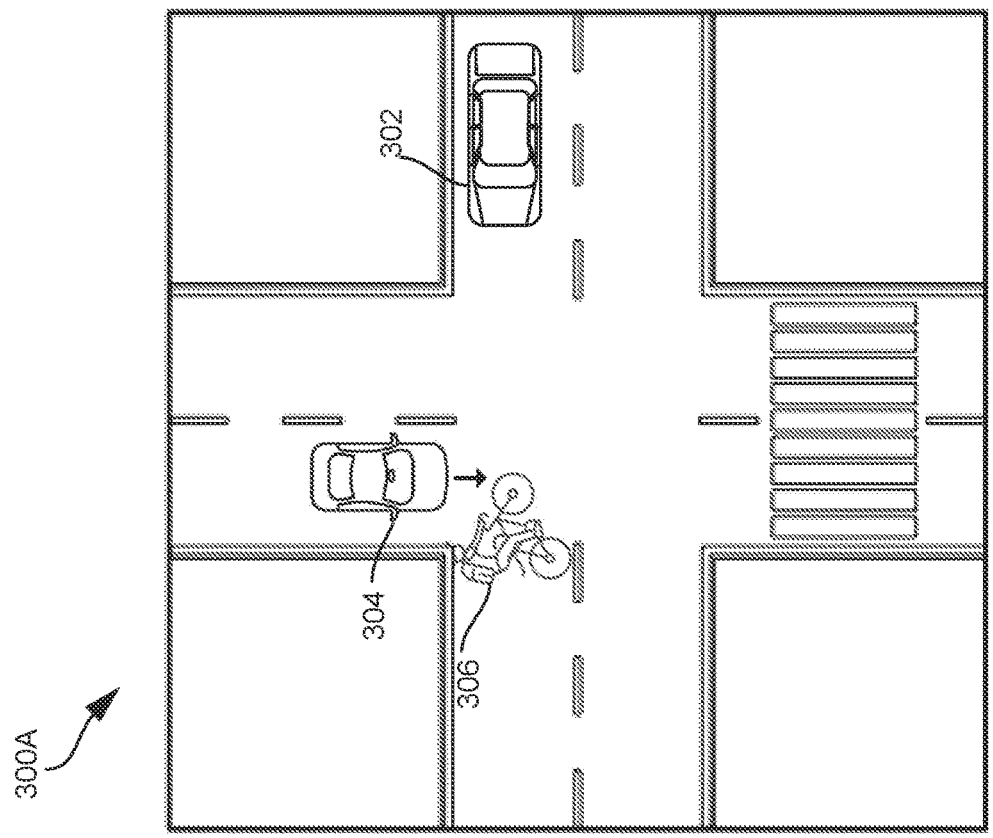
FIG. 3A illustrates an example of a recorded scene from AV driving data, according to some examples of the present disclosure.

According to some aspects, simulation system 220 can determine a safety score of the vehicle identified in AV driving data. In some examples, the safety score can be determined based on various factors. Examples of factors can include but are not limited to a minimum time or distance to collision (assuming both actors (e.g., AV 302 and vehicle 304 as illustrated in FIGS. 3A and 3B) continue their current trajectory, i.e., how close did they get), presence of an evasive maneuver needed or taken to or avoid a collision, and a degree of any evasive maneuver needed or taken to avoid a collision (e.g., maximum deceleration or swerving needed/taken). In some examples, if the safety score of the vehicle is lower than a safety threshold, simulator 222 can generate a simulation scenario emulating the driving environment with the vehicle for simulating navigation of AV 202 along the trajectory of the vehicle.

According to some examples, simulator 222 can determine that the vehicle in the driving environment is performing a driving feature that is absent in AV 202. In some examples, AV 202 may not have certain features enabled yet, and therefore, does not have historical first-hand experiences involving those features. For example, AV 202 may not be capable of making a right turn on red. As follows, AV 202 does not have first-hand experience of turning right on red. In order to test this feature (i.e., a new capability of AV 202) in simulation, since there is no available real-world data that includes AV 202 making a right turn on red, a test scenario needs to be constructed manually from scratch. Instead, according to some implementations of the present technology, simulator 222 can look for driving data where AV 202 witnessed a scene where another vehicle is making a right turn on red. While AV 202 has never performed the new feature, AV 202 has likely seen many examples of other vehicles making a right turn on red, which have been captured in the driving data of AV 202. Simulator 222 can generate a simulation driving scenario emulating the scene and enable the vehicle-to-AV perspective switch.

Further, simulator 222 can determine a safety score of AV 202 for simulated navigation in the simulation scenario. Simulation system 220 can compare the safety score of the vehicle in the driving event with the safety score of AV 202 in the simulation scenario.

According to some examples, simulator 222 can determine that a driver of the vehicle in the driving environment is a human. In such cases, simulator 222 can use the safety score of the vehicle as a baseline for determining the safety of AV 202 in the simulation driving scenario. For example, a human behavior can be taken as a comparison baseline or a lower bound to determine the safety of AV 202 to make sure that AV behaves at least as good (or safely) as the human behavior.

FIG. 3A illustrates an example recorded scene 300A, which is witnessed by AV 302 (similar to AV 102 and 202 as illustrated in FIGS. 1 and 2). In recorded scene 300A, vehicle 304 encounters cyclist 306 who is riding a bike in the wrong direction and is about to collide with vehicle 304. Example types of vehicle 304 can include, but are not limited to, cars, wagons, trucks, buses, motorcycles, bicycles, railed vehicles, watercraft, and/or aircraft.

While AV 202 is not involved in a safety critical event or a rare event in recorded scene 302, AV 202 has witnessed a safety critical event of other vehicle 304 where vehicle 304 nearly hit cyclist 306 who was riding a bike in the wrong direction. Various sensor systems of AV 304 can capture the scene and provide information that describes, for example, the location, position, orientation, and speed of vehicle 304 and cyclist 306, and the relative distance between vehicle 304 and cyclist 306. A simulation system (similar to simulation system 220 as illustrated in FIG. 2) can reproduce the scene that emulates recorded scene 300A based on the driving data that has been collected by AV 304. Further, a simulation system can identify the trajectory of vehicle and cyclist 306 based on the AV driving data.

FIG. 3B illustrates an example synthetic driving scenario 300B, which can be generated by recreating the recorded scene 300A and switching places and roles of vehicle 304 and AV 302. As shown in synthetic driving scenario 300B, a simulation system (similar to simulation system 220 as illustrated in FIG. 2) can replace vehicle 304 in recorded scene 300A with AV 302 and enable simulated navigation of AV 302 along the trajectory of vehicle 304. Vehicle 304 can be also placed in the position and role of AV 302 and follow the trajectory that AV 302 took in recorded scene 300A. Further, as AV 302 navigates in synthetic driving scenario 300B along the trajectory of vehicle 304, various sensor systems of AV 302 can collect sensor data, which can be saved on a simulation database (e.g., simulation data repository 212 as illustrated in FIG. 2).

Figure 4:
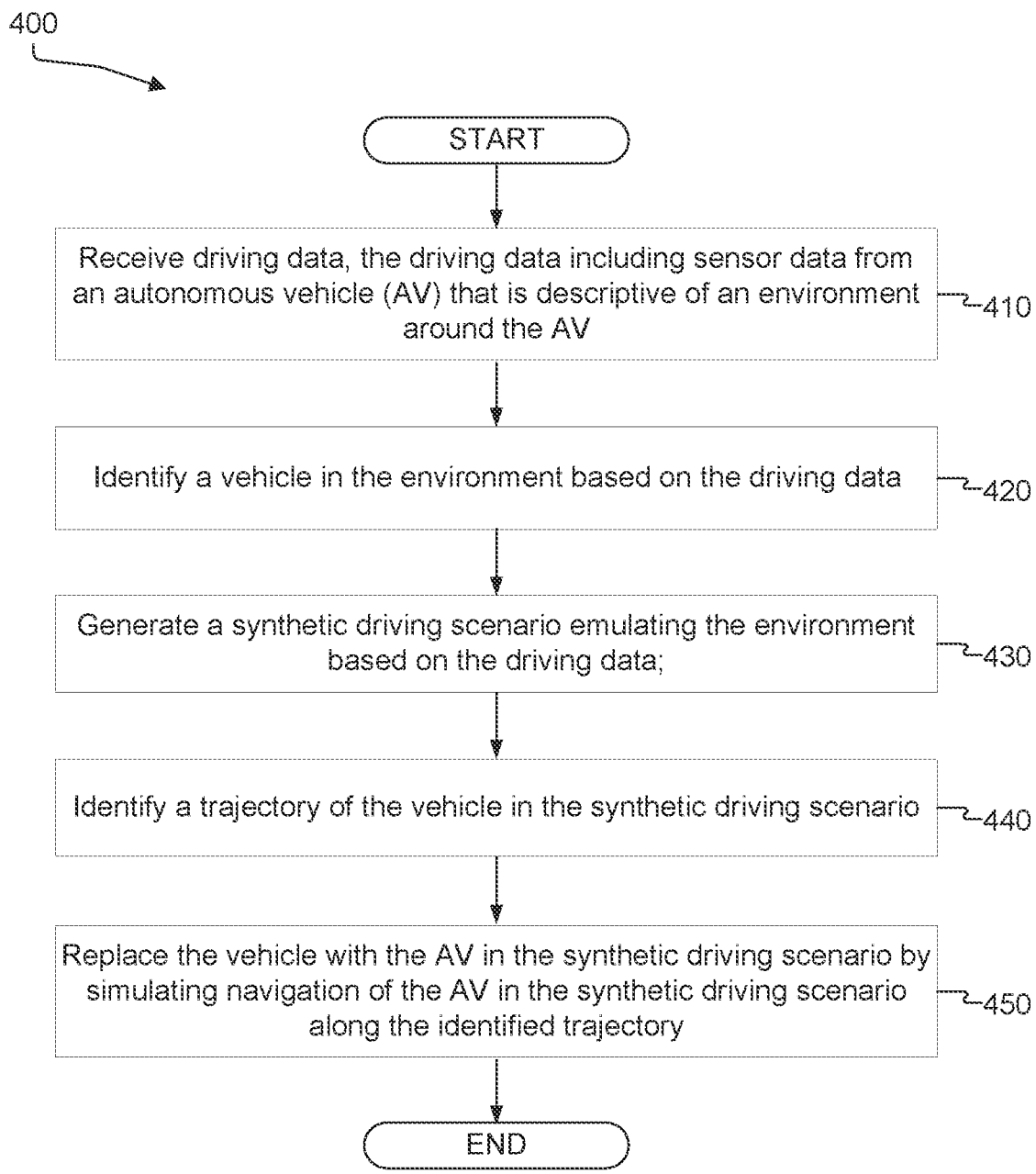
FIG. 4 illustrates a flow diagram of an example process for generating a simulation scenario based on AV driving data, according to some examples of the present disclosure.

FIG. 4 illustrates a flow diagram of an example process 400 for generating a simulation scenario based on autonomous vehicle driving data. Although the example process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At step 410, process 400 includes receiving driving data, the driving data including sensor data from an AV that is descriptive of an environment around the AV. For example, as AV 102 or 202 as illustrated in FIGS. 1 and 2 navigates, sensor systems of the AV can capture sensor data that is descriptive of an environment around the AV. As follows, simulation system 220 can receive driving data of AV 202, which includes the sensor data.

At step 420, process 400 includes identifying a vehicle in the environment based on the driving data. For example, simulation system 220 can identify a vehicle (e.g., vehicle 304 in FIG. 3) in the environment based on the driving data.

At step 430, process 400 includes generating a synthetic driving scenario emulating the environment based on the driving data. For example, simulation system 220 can generate a synthetic driving scenario emulating the environment based on the driving data.

At step 440, process 400 includes identifying a trajectory of the vehicle in the synthetic driving scenario. For example, simulation system 220 can identify a trajectory of the vehicle (e.g., vehicle 304 in FIG. 3) in the synthetic driving scenario.

At step 450, process 400 includes replacing the vehicle with the AV in the synthetic driving scenario by simulating navigation of the AV in the synthetic driving scenario along the identified trajectory. For example, simulation system 220 can replace the vehicle (e.g., vehicle 304 in FIG. 3) with AV 302 in the synthetic driving scenario by simulating navigation of the AV in the synthetic driving scenario along the identified trajectory as illustrated in FIG. 3.

As described herein, the present technology is applicable for various use cases. In some examples, the present technology can evaluate safety metrics (e.g., distributions) on other vehicles in a scene that is witnessed by an AV. Further, the safety metrics of other vehicles can be compared to the one of AV, which can be measured in a simulation driving scenario.

In other examples, the present technology can count the number of safety critical events (or collision events) that an AV has witnessed in AV driving dataset. Further, the number of safety critical events of other entities observed by an AV can be compared to a number of safety critical events that an AV is involved in the simulation driving scenarios that were regenerated based on the driving scenes of other entities.

In some examples, the present technology can find categories of safety critical events where AV drives significantly differently than other cars. In other words, it can compare the other vehicles behaviors in the driving environments witnessed by an AV and AV behaviors in the scenario that is replicate of the driving environments to evaluate the AV's decision. For example, if a vehicle had hard brakes, but an AV did not, the present technology can compare the two behaviors and evaluate AV's assessment of the safety of the driving scenario.

In some examples, the present technology can be used to generate a test scenario based on AV driving data to test a new capability/feature to be implemented on AV. Without having to manually craft test scenarios, a simulation system can receive AV driving data that includes driving environments where other vehicles have performed the new capability and generate a test scenario that replicates the driving environments to perform a vehicle-to-AV perspective swap.

Examples of generating a test scenario based on AV driving data for a vehicle-to-AV perspective change described above can provide the following advantages compared to currently available methods. Instead of relying on manually scripted scenarios, the present technology can expand the use of AV driving data as a source of generating a test scenario. As follows, simulation database (for test scenarios or simulation data) can be further enriched.

Further, it is critical to test an AV in corner-case scenarios that are hard to test in the real world and diagnose issues that may arise in a real-world setting. The present technology can target the areas that lack simulation data to evaluate the safety of an AV in long-tail events. An AV can be tested more to enrich database for test scenarios and simulation data.

The present disclosure can be also applicable for testing a new feature that an AV has never done or that has not been implemented on an AV. While an AV may not have first-hand experience, such a feature might have been performed by another vehicle and witnessed by the AV.

Figure 5:
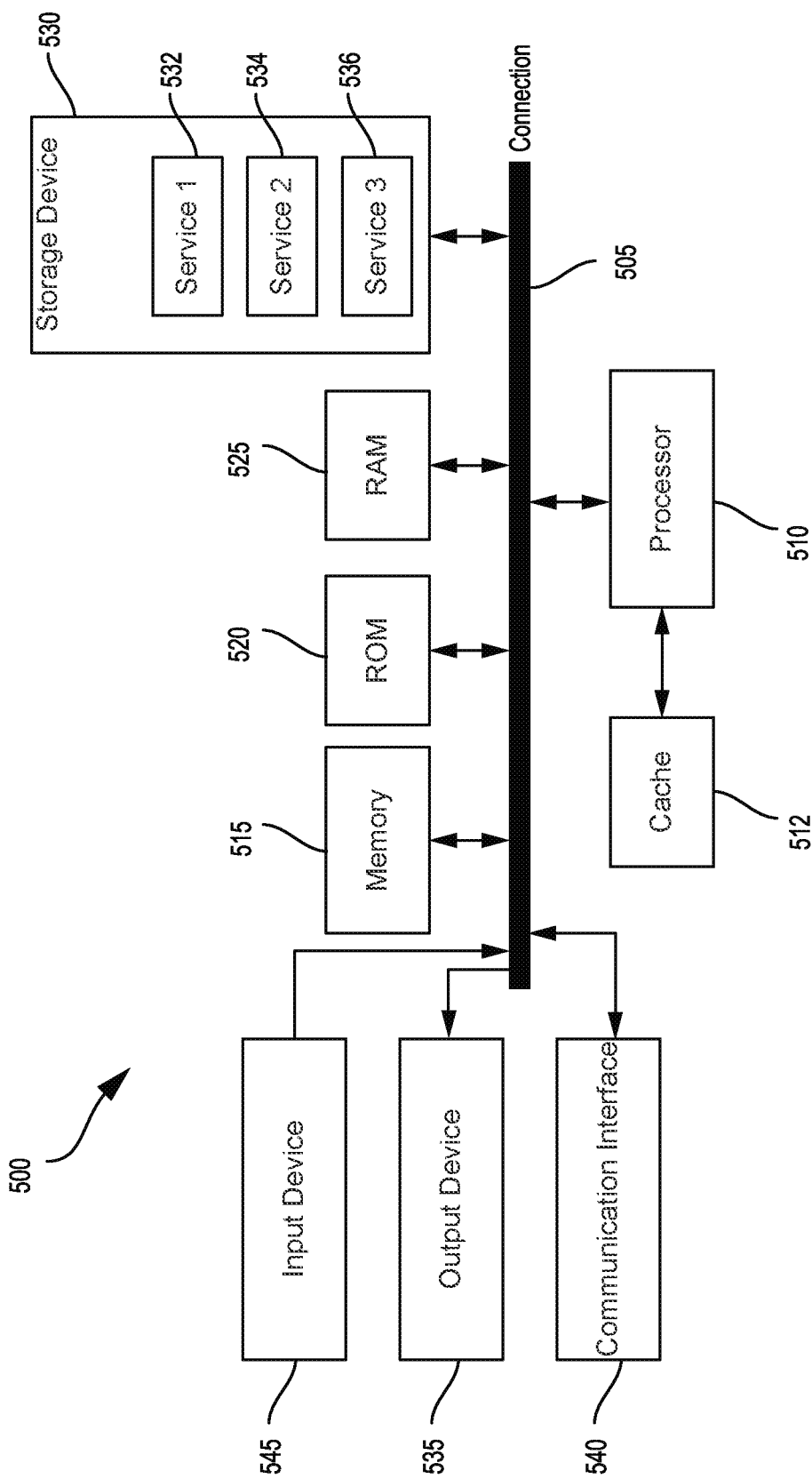
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: receiving driving data, the driving data including sensor data from an autonomous vehicle (AV) that is descriptive of an environment around the AV; identifying a vehicle in the environment based on the driving data; generating a synthetic driving scenario emulating the environment based on the driving data; identifying a trajectory of the vehicle in the synthetic driving scenario; and replacing the vehicle with the AV in the synthetic driving scenario by simulating navigation of the AV in the synthetic driving scenario along the identified trajectory.

Aspect 2. The method of Aspect 1, further comprising: collecting synthetic sensor data collected by the AV while navigating in the synthetic driving scenario.

Aspect 3. The method of Aspect 1 or 2, further comprising: determining a safety score of the vehicle in the environment; determining a safety score of the AV in the synthetic driving scenario; and comparing the safety score of the vehicle in the environment with the safety score of the AV in the synthetic driving scenario.

Aspect 4. The method of any of Aspects 1 to 3, further comprising: determining that the vehicle is involved in a safety critical event.

Aspect 5. The method of any of Aspects 1 to 4, wherein the safety critical event is a collision event.

Aspect 6. The method of any of Aspects 1 to 5, further comprising: querying a database that stores test scenarios; and determining that a number of the safety critical event observed in the test scenarios is less than a threshold.

Aspect 7. The method of any of Aspects 1 to 6, further comprising: determining a safety score of the vehicle in the environment; and determining that the safety score of the vehicle is below a threshold safety score.

Aspect 8. The method of any of Aspects 1 to 7, determining that the vehicle in the environment is performing a driving feature that is absent in the AV.

Aspect 9. The method of any of Aspects 1 to 8, further comprising: determining a safety score of the vehicle in the environment; determining that a driver of the vehicle in the environment is a human; and using the safety score of the vehicle as a baseline for determining a safety of the AV in the synthetic driving scenario.

Aspect 10. The method of any of Aspects 1 to 9, further comprising: modifying the synthetic driving scenario based on a configuration of the AV.

Aspect 11. A system comprising: at least one memory; and at least one processor coupled to the at least one memory, the at least one processor configured to: receive driving data, the driving data including sensor data from an autonomous vehicle (AV) that is descriptive of an environment around the AV; identify a vehicle in the environment based on the driving data; generate a synthetic driving scenario emulating the environment based on the driving data; identify a trajectory of the vehicle in the synthetic driving scenario; and replace the vehicle with the AV in the synthetic driving scenario by simulating navigation of the AV in the synthetic driving scenario along the identified trajectory.

Aspect 12. The system of Aspect 11, wherein the at least one processor is configured to: collect synthetic sensor data collected by the AV while navigating in the synthetic driving scenario.

Aspect 13. The system of Aspect 11 or 12, wherein the at least one processor is configured to: determine a safety score of the vehicle in the environment; determine a safety score of the AV in the synthetic driving scenario; and compare the safety score of the vehicle in the environment with the safety score of the AV in the synthetic driving scenario.

Aspect 14. The system of any of Aspects 11 to 13, wherein the at least one processor is configured to: determining that the vehicle is involved in a safety critical event.

Aspect 15. The system of any of Aspects 11 to 14, wherein the safety critical event is a collision event.

Aspect 16. The system of any of Aspects 11 to 15, wherein the at least one processor is configured to: query a database that stores test scenarios; and determine that a number of the safety critical event observed in the test scenarios is less than a threshold.

Aspect 17. The system of any of Aspects 11 to 16, wherein the at least one processor is configured to: determining a safety score of the vehicle in the environment; and determining that the safety score of the vehicle is below a threshold safety score.

Aspect 18. The system of any of Aspects 11 to 17, wherein the at least one processor is configured to: determine that the vehicle in the environment is performing a driving feature that is absent in the AV.

Aspect 19. The system of any of Aspects 11 to 18, wherein the at least one processor is configured to: determine a safety score of the vehicle in the environment; determine that a driver of the vehicle in the environment is a human; and use the safety score of the vehicle as a baseline for determining a safety of the AV in the synthetic driving scenario.

Aspect 20. A non-transitory computer-readable storage medium comprising at least one instruction for causing a computer or processor to perform a method according to any of Aspects 1 to 10.

Aspect 21. A system comprising means for performing a method according to any of Aspects 1 to 10.

What is claimed is:

1. A method comprising:
   receiving driving data, the driving data including sensor data from an autonomous vehicle (AV) that is descriptive of an environment around the AV that is following a first trajectory;
   identifying a representation of a vehicle in the environment based on the driving data;
   generating a synthetic driving scenario emulating the environment based on the driving data;
   identifying a second trajectory of the representation of the vehicle in the synthetic driving scenario;
   replacing the representation of the vehicle with a representation of the AV in the synthetic driving scenario by simulating navigation of the representation of the AV in the synthetic driving scenario along the second trajectory; and
   replacing the representation of the AV with the representation of the vehicle in the synthetic driving scenario by simulating navigation of the representation of the vehicle in the synthetic driving scenario along the first trajectory.

2. The method of claim 1, further comprising collecting synthetic sensor data collected by the representation of the AV while navigating in the synthetic driving scenario.

3. The method of claim 1, further comprising:
   determining a safety score of the representation of the vehicle in the environment;
   determining a safety score of the representation of the AV in the synthetic driving scenario; and
   comparing the safety score of the representation of the vehicle in the environment with the safety score of the representation of the AV in the synthetic driving scenario.

4. The method of claim 1, further comprising determining that the representation of the vehicle is involved in a safety critical event.

5. The method of claim 4, wherein the safety critical event is a collision event.

6. The method of claim 4, further comprising:
   querying a database that stores test scenarios; and
   determining that a number of the safety critical event observed in the test scenarios is less than a threshold.

7. The method of claim 4, further comprising:
   determining a safety score of the representation of the vehicle in the environment; and
   determining that the safety score of the representation of the vehicle is below a threshold safety score,
   wherein replacing the representation of the vehicle with the representation of the AV is in response to determining that the safety score is below the threshold safety score.

8. The method of claim 1, further comprising determining that the representation of the vehicle in the environment is performing a driving feature that is absent in the AV.

9. The method of claim 1, further comprising:
   determining a safety score of the representation of the vehicle in the environment;
   determining that a driver of the representation of the vehicle in the environment is a human; and
   using the safety score of the representation of the vehicle as a baseline for determining a safety of the representation of the AV in the synthetic driving scenario.

10. A system comprising:
    at least one memory; and
    at least one processor coupled to the at least one memory, the at least one processor configured to:
       receive driving data, the driving data including sensor data from an autonomous vehicle (AV) that is descriptive of an environment around the AV that is following a first trajectory;
       identify a representation of a vehicle in the environment based on the driving data;
       generate a synthetic driving scenario emulating the environment based on the driving data;
       identify a second trajectory of the representation of the vehicle in the synthetic driving scenario;
       replace the representation of the vehicle with a representation of the AV in the synthetic driving scenario by simulating navigation of the representation of the AV in the synthetic driving scenario along the second trajectory; and
       replace the representation of the AV with the representation of the vehicle in the synthetic driving scenario by simulating navigation of the representation of the vehicle in the synthetic driving scenario along the first trajectory.

11. The system of claim 10, wherein the at least one processor is configured to collect synthetic sensor data collected by the representation of the AV while navigating in the synthetic driving scenario.

12. The system of claim 10, wherein the at least one processor is configured to:
    determine a safety score of the representation of the vehicle in the environment;
    determine a safety score of the representation of the AV in the synthetic driving scenario; and
    compare the safety score of the representation of the vehicle in the environment with the safety score of the representation of the AV in the synthetic driving scenario.

13. The system of claim 10, wherein the at least one processor is configured to determine that the representation of the vehicle is involved in a safety critical event.

14. The system of claim 13, wherein the safety critical event is a collision event.

15. The system of claim 13, wherein the at least one processor is configured to:
    query a database that stores test scenarios; and
    determine that a number of the safety critical event observed in the test scenarios is less than a threshold.

16. The system of claim 13, wherein the at least one processor is configured to:
    determining a safety score of the representation of the vehicle in the environment; and
    determining that the safety score of the representation of the vehicle is below a threshold safety score.

17. The system of claim 10, wherein the at least one processor is configured to determine that the representation of the vehicle in the environment is performing a driving feature that is absent in the AV.

18. The system of claim 10, wherein the at least one processor is configured to:
   determine a safety score of the representation of the vehicle in the environment;
   determine that a driver of the representation of the vehicle in the environment is a human; and
   use the safety score of the representation of the vehicle as a baseline for determining a safety of the representation of the AV in the synthetic driving scenario.

19. A non-transitory computer-readable storage medium comprising at least one instruction for causing a computer or processor to:
   receive driving data, the driving data including sensor data from an autonomous vehicle (AV) that is descriptive of an environment around the AV that is following a first trajectory;
   identify a representation of a vehicle in the environment based on the driving data;
   generate a synthetic driving scenario emulating the environment based on the driving data;
   identify a second trajectory of the representation of the vehicle in the synthetic driving scenario;
   replace the representation of the vehicle with a representation of the AV in the synthetic driving scenario by simulating navigation of the representation of the AV in the synthetic driving scenario along the second trajectory; and
   replace the representation of the AV with the representation of the vehicle in the synthetic driving scenario by simulating navigation of the representation of the vehicle in the synthetic driving scenario along the first trajectory.

20. The method of claim 1, wherein replacing the representation of the vehicle with the representation of the AV includes adjusting the synthetic driving scenario based on a configuration of the representation of the AV relative to the representation of the vehicle, including adjusting a distance between the representation of the AV and other objects in the synthetic driving scenario based on a size difference between the representation of the AV and the representation of the vehicle upon the representation of the AV assuming a position and role of the representation of the vehicle.

* * * * *